(12) United States Patent
Shioiri et al.

(10) Patent No.: US 7,216,005 B2
(45) Date of Patent: May 8, 2007

(54) CONTROL APPARATUS FOR INJECTION MOLDING MACHINE

(75) Inventors: Takayoshi Shioiri, Hanishina-gun (JP); Eiki Iwashita, Hanishina-gun (JP); Yoshitoshi Yamagiwa, Hanishina-gun (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 0 days.

(21) Appl. No.: 11/390,660

(22) Filed: Mar. 28, 2006

(65) Prior Publication Data

US 2006/0224540 A1    Oct. 5, 2006

(30) Foreign Application Priority Data

Apr. 1, 2005    (JP) .............................. 2005-106282

(51) Int. Cl.
G05B 13/02 (2006.01)
G06F 19/00 (2006.01)
G06F 15/00 (2006.01)
G06F 15/18 (2006.01)
B29C 45/00 (2006.01)
G21C 17/00 (2006.01)

(52) U.S. Cl. .......................... 700/48; 700/52; 700/103; 700/110; 700/200; 702/82; 702/84; 702/182; 706/14; 706/21; 706/23; 706/904

(58) Field of Classification Search .................. 700/28, 700/29, 31–34, 47–52, 54, 71, 103–105, 700/108–110; 702/182, 183, 185, 194; 706/1–6, 706/14–16, 19, 21, 23, 25, 26, 33, 38, 41, 706/902–904

See application file for complete search history.

(56) References Cited

U.S. PATENT DOCUMENTS

| 5,461,570 | A | * | 10/1995 | Wang et al. ................. 700/110 |
| 5,586,041 | A | * | 12/1996 | Mangrulkar ................. 700/174 |
| 5,671,335 | A | * | 9/1997 | Davis et al. ................... 706/25 |
| 6,036,466 | A | * | 3/2000 | Bayer et al. ................. 425/144 |
| 6,847,854 | B2 | * | 1/2005 | Discenzo ...................... 700/99 |
| 6,901,391 | B2 | * | 5/2005 | Storm et al. .................. 706/16 |
| 6,914,537 | B2 | * | 7/2005 | Yoshinaga et al. .......... 340/679 |
| 7,117,050 | B2 | * | 10/2006 | Sasaki et al. ................. 700/83 |
| 7,117,056 | B2 | * | 10/2006 | Balic .......................... 700/104 |
| 2001/0051858 | A1 | * | 12/2001 | Liang et al. ................... 703/2 |
| 2006/0138690 | A1 | * | 6/2006 | Schwaiger et al. ........ 264/40.6 |
| 2006/0202371 | A1 | * | 9/2006 | Ehbing et al. ............. 264/40.1 |

FOREIGN PATENT DOCUMENTS

| JP | 3-266622 | 11/1991 |
| JP | 5-309711 | 11/1993 |

* cited by examiner

Primary Examiner—Crystal J. Barnes
(74) Attorney, Agent, or Firm—Hamre, Schumann, Mueller & Larson, P.C.

(57) ABSTRACT

Test molding and mass-production molding are performed by an injection molding machine that includes a control apparatus in which neural networks are used. A quality prediction function determined based on the test molding is revised as necessary during mass-production molding.

4 Claims, 6 Drawing Sheets

CONTROL APPARATUS FOR INJECTION MOLDING MACHINE

FIELD OF THE INVENTION

The present invention relates to a control apparatus for an injection molding machine, wherein the apparatus uses a neural network.

BACKGROUND OF THE INVENTION

Injection molding machines allow resin products to be manufactured while molding conditions are adjusted. When unsatisfactory products have been produced, the molding conditions are corrected to ensure that satisfactory products are obtained. The molding control method that uses a neural network and is disclosed, for example, in Japanese Patent Laid-Open Publication No. HEI-5-309711 is proposed as a technique for correcting molding conditions. The use of a neural network makes it possible to efficiently deal with nonuniform monitor values and to reduce the time and cost of test runs.

The principle of a neural network is described below with reference to FIG. 6 hereof.

FIG. 6 shows an example of a layered neural network configured from an input layer 100 composed of four input units, an intermediate layer 110 composed of one layer having five units, and an output layer 120 composed of one output unit.

In the input layer 100, for example, a monitor value S1 related to the farthest forward location of injection as determined by a sensor provided to the injection molding machine, a monitor value S2 related to the location at the start of weighing, a monitor value S3 related to the temperature of the opening through which material falls, and a monitor value S4 related to peak loading pressure are inputted, respectively, to first, second, third, and fourth input units 101, 102, 103, and 104.

The value of the first unit 111 of the intermediate layer 110 is determined by processing the monitor values S1, S2, S3, and S4 with the aid of a threshold value and the weighting factors determined for each input. The value of the second unit 112 of the intermediate layer 110 is determined by processing the monitor values S1, S2, S3, and S4 with the aid of another threshold value and the weighting factors determined for each input. The values of the third through fifth units 113 through 115 are determined in the same manner.

The output unit 121 of the output layer 120 is determined by processing the values of the first through fifth units 111 through 115 of the intermediate layer 110 with the aid of yet another threshold and the weighting factors determined for each of the first through fifth units 111 through 115. This output unit 121 has a predicted weight obtained from the predicted quality value of the molded articles in this example.

Since the neural network is a function, the monitor values S1 through S4 inputted to the input layer 100 and the output layer 120 can be assumed to be known quantities, and the weighting factors and thresholds in the function can be assumed to be unknown quantities. Specifically, the monitor values S1 through S4 are provided to the input layer 100, and the measured weight of the molded articles is provided to the output layer 120. The weight predicted by a computer is repeatedly calculated while revising the weighting factors and the thresholds until the predicted weight matches the measured weight. When the predicted weight satisfactorily matches the measured weight, the weighting factors and the thresholds are determined. When the weighting factors and the thresholds are determined, the function, or, specifically, the quality prediction function, is established.

Thus, if a neural network is used, a quality prediction function can be established by estimating the weighting factors and the thresholds in addition to calculating the predicted weights.

The inventors conducted confirmation experiments using an injection molding machine having a neural network with the object of confirming the precision of the neural network. Summaries of the experiments are as follows.

(1) Molding conditions are set with a high probability that satisfactory products will be obtained.

(2) 20 shots are conducted. At this time, the monitor values are obtained by a sensor in the injection molding machine.

(3) The weight of the molded article is measured for each shot.

(4) The weighting factors and the thresholds in the neural network are determined using the monitor values as the input of the neural network, and the weights of the molded articles as the output of the neural network. The weighting factor and threshold used in one shot are corrected for the next text molding. Repeating such corrections is referred to as "learning."

(5) The neural network (quality prediction function) is established by means of the learning in these 20 shots. This neural network (quality prediction function) can also be said to be a weight prediction function in which the weighting factors and the thresholds are determined. Therefore, predicted weights can be outputted when the monitor values are inputted to the weight prediction function.

(6) Mass-production molding begins with the 21st shot. The weight prediction function is not revised with mass-production molding. The monitor values continue to be obtained by the sensor in the injection molding machine in mass-production molding.

(7) The weights of the molded articles are then measured. The weights as measured are referred to as the measured weights.

(8) The predicted weights are calculated by inputting the monitor values obtained in (6) to the neural network (weight prediction function) in which the learning process has been completed.

(9) The measured weights and the predicted weights Ws are compared to determine the "probability" of the predicted weights Ws.

The results of the confirmation test described above are shown in FIG. 7. The horizontal axis indicates the number of shots, the vertical axis indicates the weight of the molded articles, the bold-line graph represents the measured weights Wact, and the thin-line graph represents the predicted weights Ws.

The numbers 0 to 20 along the horizontal axis indicate the range of test moldings, and the numbers 21 and up indicate the range of mass-production moldings.

The weight prediction function is determined in the shots 1 through 20.

In the shots 21 through 50, the monitor values are inputted to the determined weight prediction function, and the predicted weights Ws are outputted, whereupon the predicted weights Ws are found to be very close to the measured weights Wact.

In the shots 51 through 110, the monitor values are inputted to the weight prediction function, and the predicted weights Ws are outputted, whereupon the predicted weights Ws are found deviate considerably from the measured weights Wact.

The shots 51 through 110 are believed to be affected by changes over time and by slight revisions in the molding conditions during mass-production molding.

It is necessary to avoid any loss in the predicted precision starting at a certain point in time in order to be able to continuously conduct multiple shots with an injection molding machine, and improved techniques are needed.

SUMMARY OF THE INVENTION

According to an aspect of the present invention, there is provided a control apparatus for an injection molding machine, the apparatus having a neural network and operating so that information on test molding is inputted to the neural networks, a quality prediction function is determined by repeating the estimation of weight factors and thresholds on the neural networks as many times as the number of test molding cycles, and mass-production molding is begun with this quality prediction function, the control apparatus further comprising: an upper/lower control limit determination unit for setting an upper control limit and a lower control limit for each of the monitor values that indicate the state in each part of a molding machine; and a function revision need determining unit for setting the range between the upper control limit and lower control limit set by the upper/lower control limit determination unit as the control range, and outputting a revision command for the quality prediction function and/or generating an alarm signal from an alarm signal generating unit when the monitor values acquired during mass-production molding have deviated from the control range.

Since the control apparatus includes a function revision need determining unit, the quality prediction function can be revised by the control apparatus when the monitor values have changed by a specific amount or greater during mass-production molding. The reliability of quality prediction can be improved by revising the quality prediction function during mass-production molding.

Also, an alarm signal can be generated by the alarm signal generating unit when the monitor values have changed by a specific amount or greater, which can encourage the operator to review the quality prediction function.

It is preferable that the upper control limit be a maximum value selected from the monitor group obtained by test molding, and that the lower control limit be a minimum value selected from the monitor group obtained by test molding.

The system is easily managed because the maximum value and the minimum value are determined in an unambiguous manner.

It is preferable that the control apparatus perform control wherein an alarm signal is generated from the alarm signal generating unit when the monitor values acquired during mass-production molding have deviated from the control range, and the quality prediction function is revised and/or the operation of the molding machine is stopped either when this alarm signal has continued for a specific number of times or when the cumulative number of alarm signals has reached a specific number.

An alarm signal is produced when the monitor values have deviated from the control range. The control apparatus revises the function either when this alarm signal has continued for a specific number of times or when the cumulative number of signals has reached a specific number.

When the monitor values have deviated from the control range because of a disturbance in the signal system, it is believed that the monitor values will subsequently return to the control range. On this assumption, an alarm is produced in the first stage, and the function is revised in the second stage. If the process does not advance to the second stage, then the load of the control apparatus can be reduced because there is no need for the control apparatus to revise the function.

It is preferable that the control device include a calculation unit for predicting quality values by providing the monitor values to the quality prediction function, and a satisfactory product determination unit for ascertaining that the molded articles are satisfactory when the quality prediction value predicted by the calculation unit is within the required quality, and ascertaining that the molded articles are unsatisfactory when the quality prediction value does not comply with the required quality.

During mass-production molding, it is possible to determine whether products are satisfactory without measuring the molded articles. Since the molded articles do not need to be measured individually, measuring costs can be eliminated, and molding costs can be reduced.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
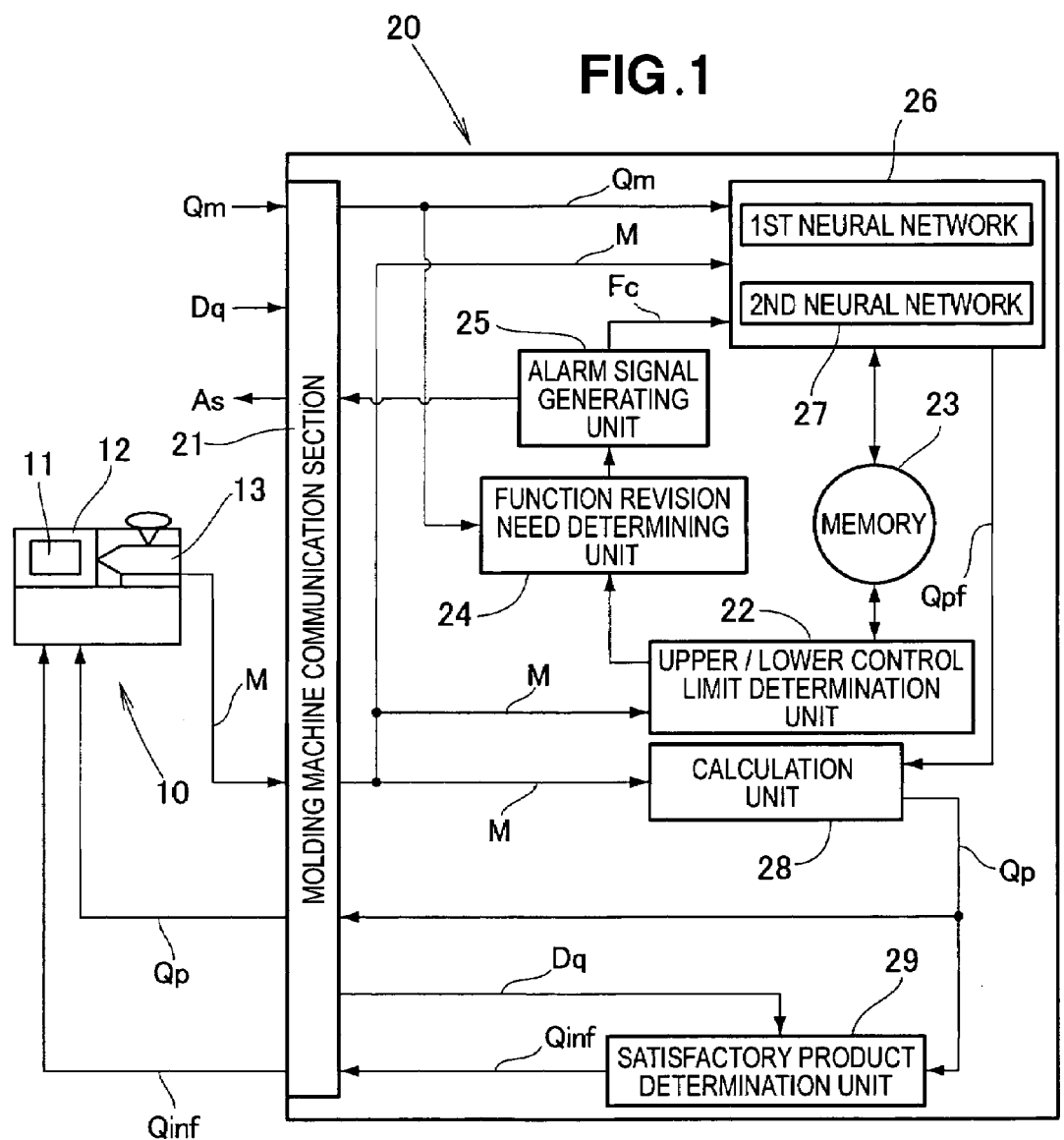
FIG. 1 is a structural block view of the control apparatus for an injection molding machine according to the present invention.

As shown in FIG. 1, an injection molding machine 10 includes a clamping device 12 for clamping a metal mold 11, and an injecting device 13 for injecting a resin into the clamped metal mold 11, and also a control apparatus 20 that has a neural network as its main element.

The control apparatus 20 includes a molding machine communication function unit 21 that has a function for interfacing with external devices, an upper/lower control limit determination unit 22 for receiving various monitor values M related to the operating state of the injection molding machine 10 and setting a maximum value that consists of an upper control limit and a minimum value that consists of a lower control limit for each of the monitor values M, memory 23 attached to the upper/lower control limit determination unit 22 and used for storing groups of monitor values M, a function revision need determining unit 24 for determining whether there is a need to revise the quality prediction function Qpf, an alarm signal generating unit 25 for generating an alarm signal As when the function revision need determining unit 24 has produced a function revision instruction signal Fc, a first neural network 26 and second neural network 27, a calculating unit 28 for calculating a quality prediction value Qp by providing the monitor values M to the quality prediction function Qpf determined by the first neural network 26 and the second neural network 27, and a satisfactory product determination unit 29 for comparing the quality prediction value Qp calculated by the calculating unit 28 with a required quality Dq and determining product quality.

The calculating unit 28 also requires a neural network, but instead of a neural network being provided independently, the first neural network 26 and the second neural network 27 can be utilized.

Figure 2:
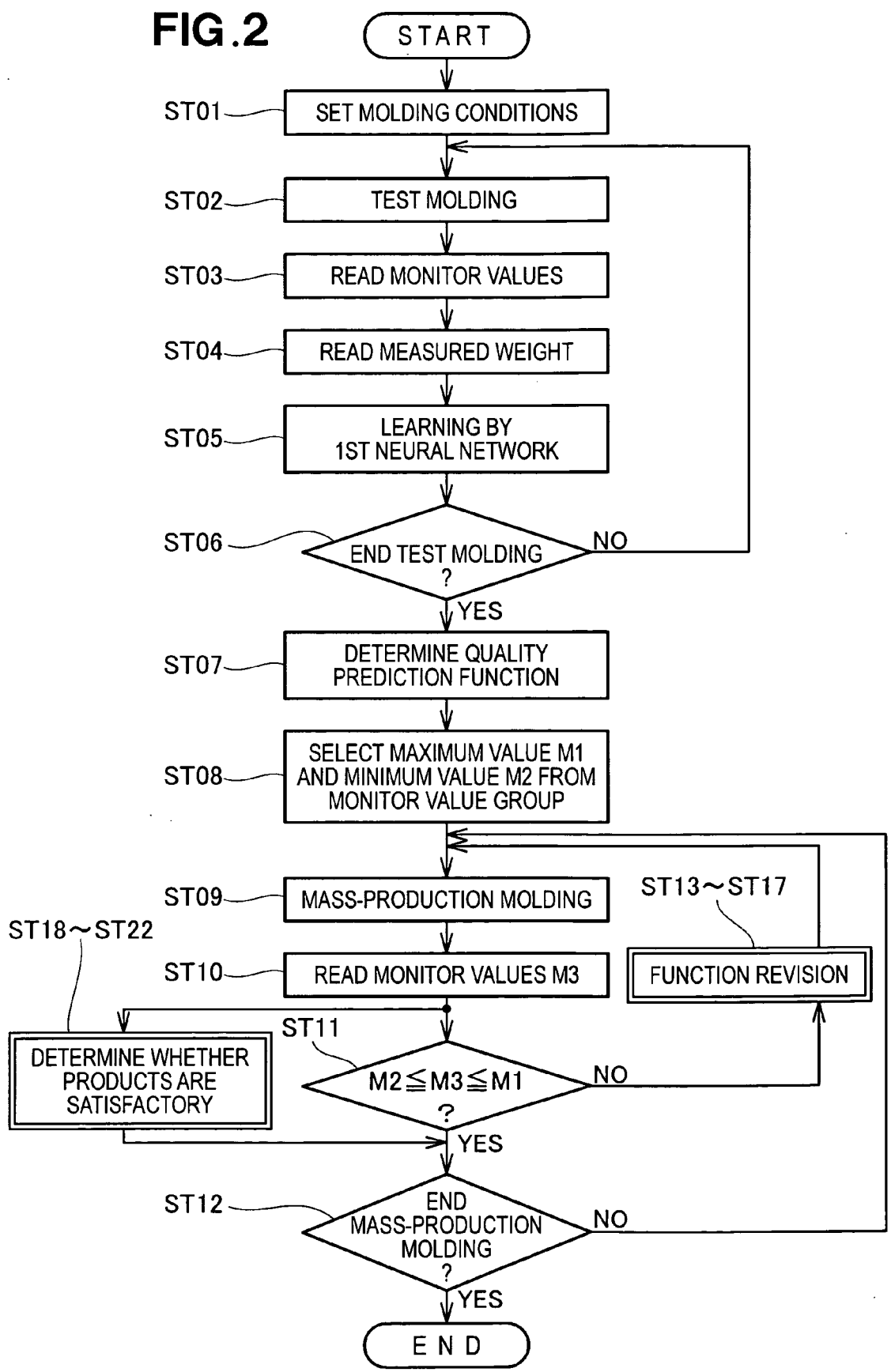
FIG. 2 is a basic control flowchart of the control apparatus according to the present invention.

The operation of the control apparatus 20 having the configuration described above will now be described with reference to FIG. 1 and to the flowchart shown in FIG. 2.

Step (hereinafter abbreviated as ST) 01: Molding conditions that have a high probability of resulting in satisfactory products are predicted and set empirically.

ST02: About 20 shots are conducted.

ST03: The monitor values M determined by the sensors provided to each part of the injection molding machine 10 are read.

ST04: A quality prediction value Qm (FIG. 1) derived from the weight (measured weight) of the molded articles obtained in the test moldings is read.

ST05: The first neural network 26 determines weighting factors and thresholds by using the various monitor values M read in ST03 as input conditions and the measured weights read in ST04 as output conditions. Specifically, the weighting factor and threshold used in one shot are revised in the next shot. Repeating such revision is referred to as "learning."

ST06: The first neural network 26 determines whether or not to end the test molding. If they are not to be ended, the process returns to ST02 and the test moldings are continued.

ST07: If it has been determined in ST06 that the test moldings are to be ended, then the quality prediction function Qpf is determined. Specifically, the weighting factors and thresholds in the first neural network 26 are determined.

ST08: A maximum value M1 and a minimum value M2 are selected from the group of monitor values M read in ST03. This process is performed for each type of monitor value. Preparations for mass-production molding are thereby considered to be completed.

ST09: Mass-production molding is performed.

ST10: The monitor values M3 in mass-production molding are read.

ST11: A determination is made as to whether the monitor values M3 that are read in ST10 lie between the maximum value M1 and the minimum value M2 selected in ST08 (this range is referred to as the control range). If not, the process advances to ST13 where the function is revised, and then the process returns to ST09 and mass-production molding is continued.

ST12: A determination is made as to whether mass-production molding is to be ended if the monitor values M3 fall between the maximum value M1 and the minimum value M2 in ST11. If not, mass-production molding is continued.

Figure 3:
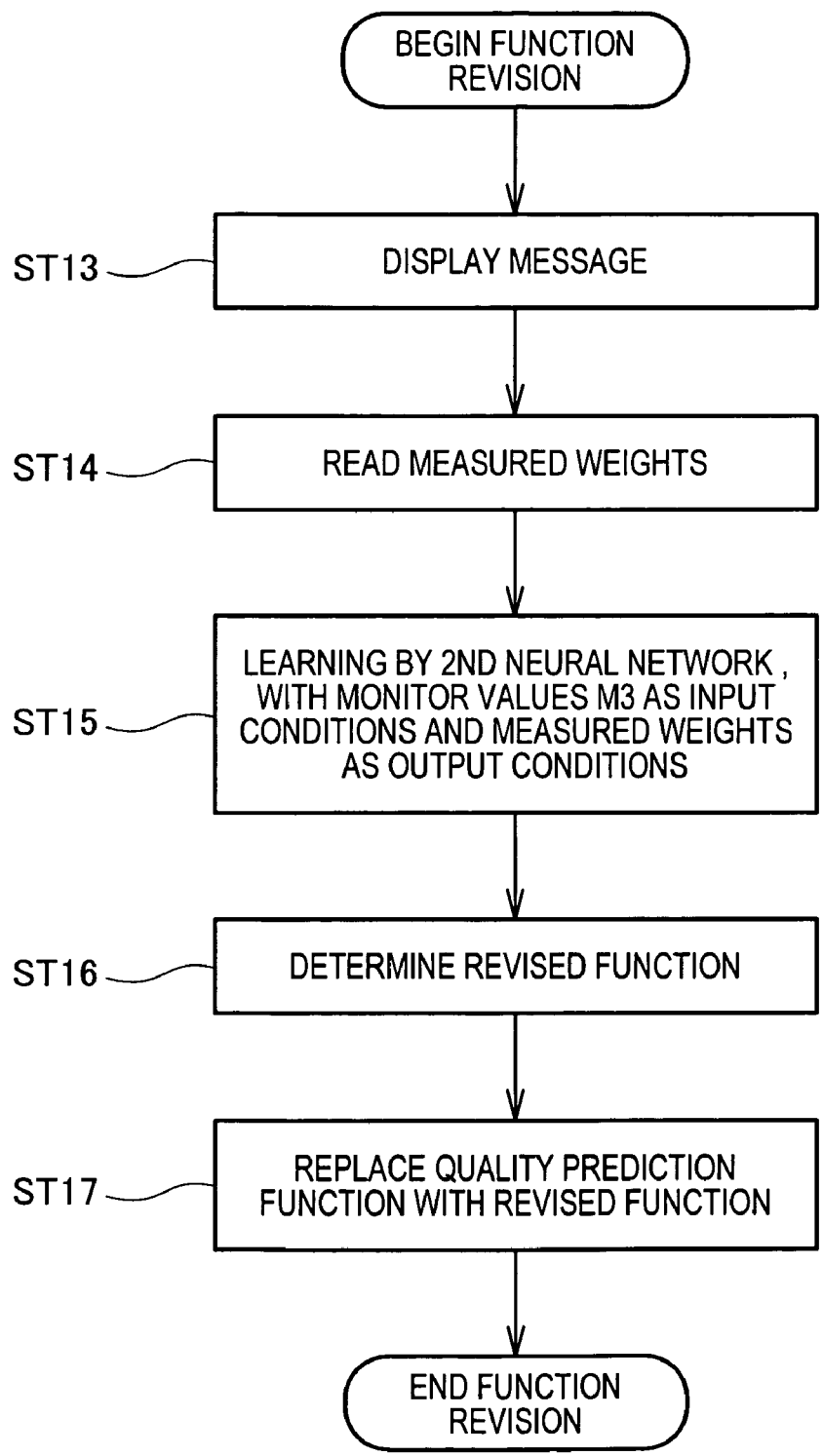
FIG. 3 is a flowchart of the function revision process according to the present invention.

Next, the process of revising the function in ST13 and onward is described in the flowchart shown in FIG. 3.

ST13: If the determination is negative in ST11 above, a message is produced indicating that the function is to be revised. This message may be either textual or audio.

ST14: The weights of the molded articles that have been molded at this time are measured and the measured weights are read on the basis of the signal indicating that the function must be revised.

ST15: The second neural network 27 revises the weighting factors and the thresholds by using the monitor values M3 that are read in ST10 as input conditions and the measured weights that are read in ST14 as output conditions.

ST16: The second neural network 27 determines the revised function (revised quality prediction function).

ST17: The quality prediction function that has been used up to this point is replaced with the revised function. The process then returns to ST09.

Figure 4:
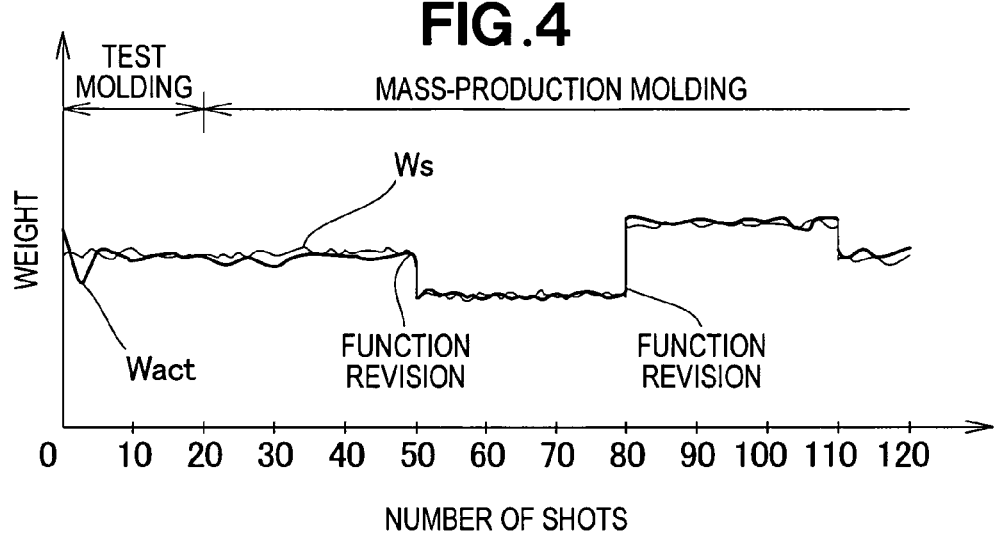
FIG. 4 is a graph showing a comparison between the measured weights and the predicted weights as found by the apparatus of the present invention.

Test molding and mass-production molding were performed by the injection molding machine 10 capable of executing control based on the flowchart described above. The results are described with reference to FIG. 4. In this figure, the horizontal axis indicates the number of shots, the vertical axis indicates the weight of the molded articles, the bold-line graph represents the measured weights Wact, and the thin-line graph represents the predicted weights Ws.

The numbers 0 to 20 on the horizontal axis are the range of the test molding, and the numbers 21 onward are the range of mass-production molding. The weights Ws predicted by the neural networks form a slightly vertically displaced graph because the monitor values vary. The measured weights Wact have fluctuated in the several initial shots, but have then since stabilized and moved very close to the predicted weights Ws by the 50th shot.

However, the measured weights Wact suddenly decreased near the 50th shot. Nevertheless, the predicted weights Ws were revised to lower values to be near the measured weights Wact because the control apparatus of the present invention had revised the function near the 50th shot. The same revision was conducted near the 80th and 110th shots, and it was confirmed that the predicted weights Ws were still very close to the measured weights Wact.

Specifically, in mass-production molding as well, it greatly increased the reliability of the predicted weights Ws by revising the function in ST13 through ST17, when it was determined in ST11 that the function (quality prediction function) had to be revised.

Figure 5:
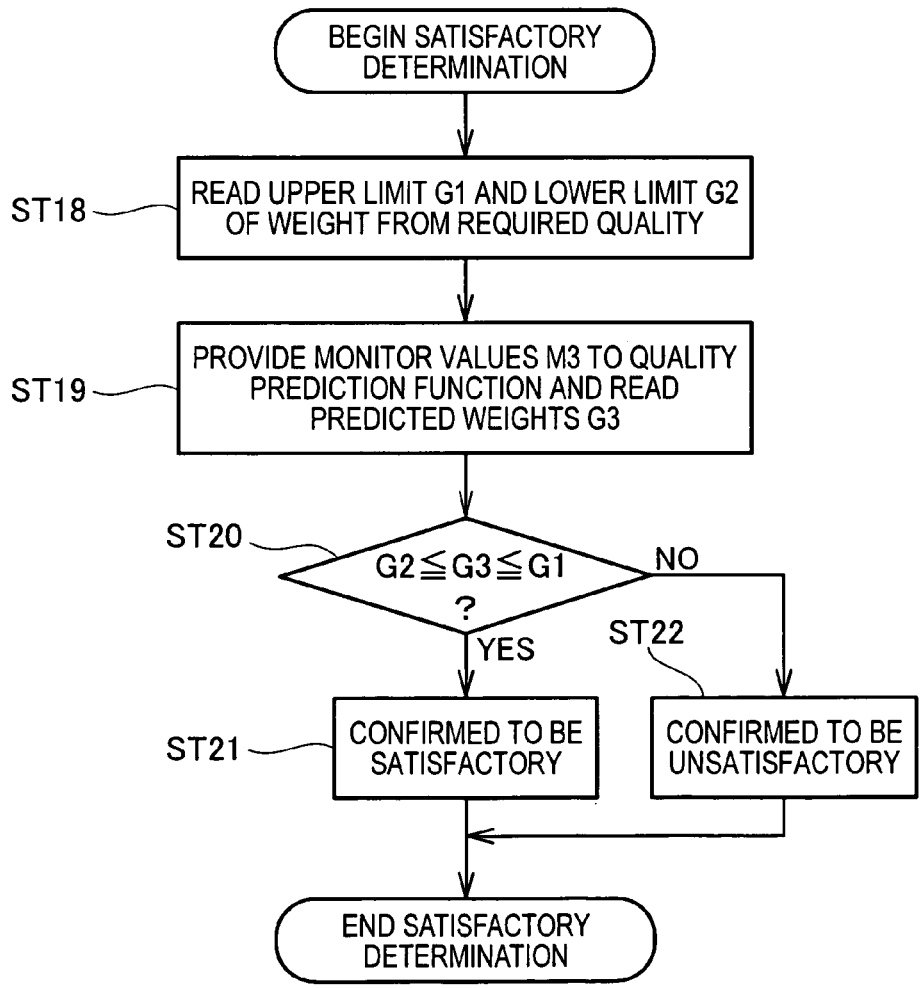
FIG. 5 is a flowchart of the process of determining whether products are satisfactory in accordance with the present invention.
Figure 6:
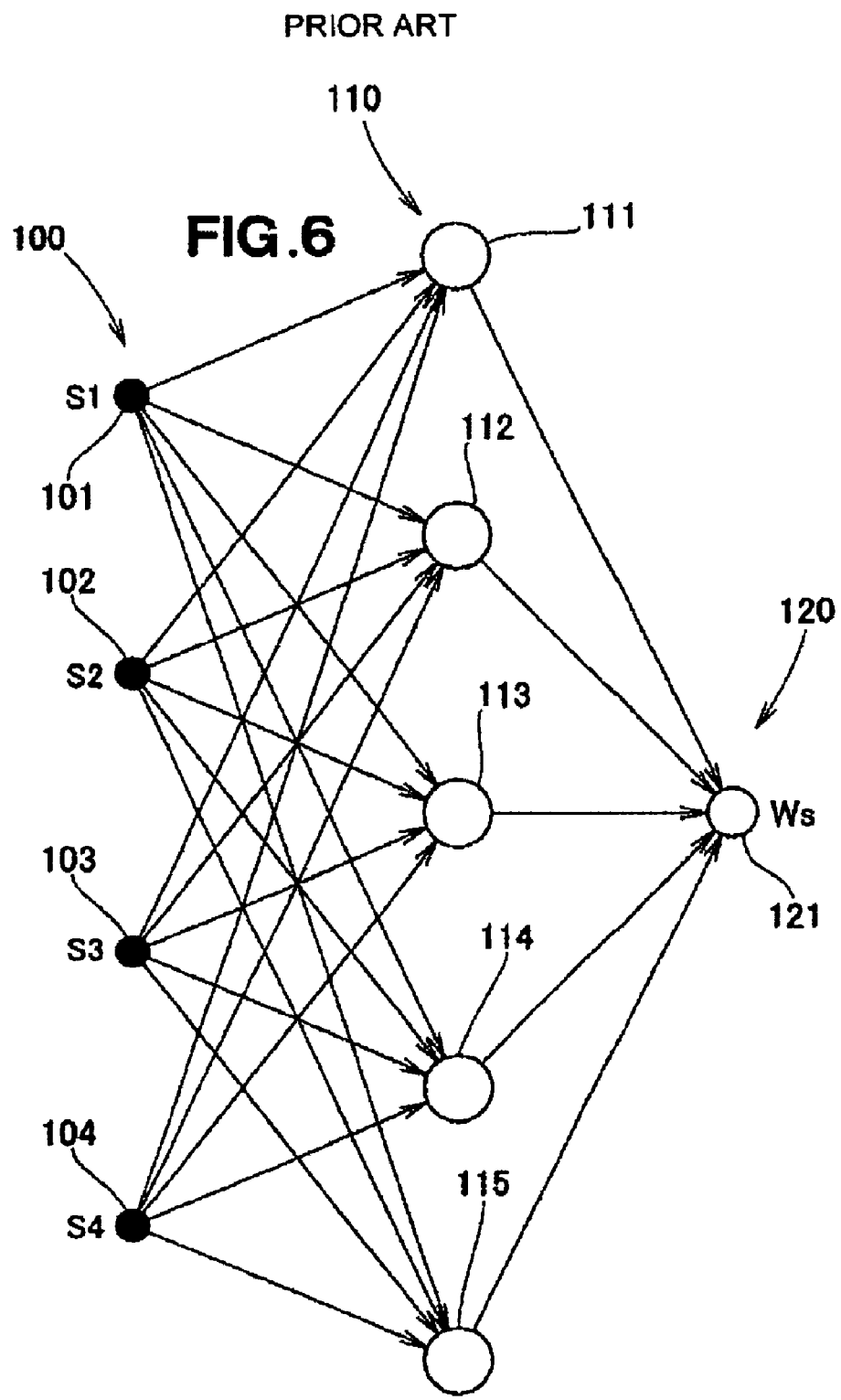
FIG. 6 is a graph showing the principle of the neural network.
Figure 7:
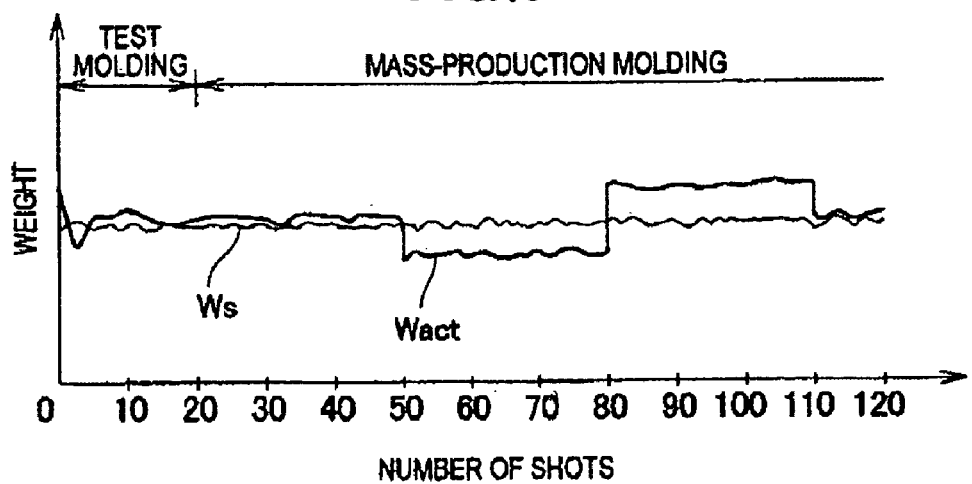
FIG. 7 is a graph showing the results of the confirmation experiment.

However, aside from revising the quality prediction function, it is possible to determine whether products are satisfactory by whether or not the weight of the molded articles falls within the acceptable range. An example of this satisfactory determination process is described with reference to the flowchart shown in FIG. 5.

ST18: The upper limit (upper limit of the allowable range) G1 and the lower limit (lower limit of the allowable range) G2 of the weights are read from the required quality Dq inputted in advance.

ST19: The monitor values M3 read in ST10 are entered into the quality prediction function Qpf, and a predicted weight G3 is calculated, which is one quality prediction value Qp.

ST20: A determination is made as to whether the predicted weight G3 is between the upper limit G1 and the lower limit G2, or, specifically, whether the required quality Dq is met.

ST21: The molded articles are determined to be satisfactory if the predicted weight G3 is between the upper limit G1 and the lower limit G2.

ST22: The molded articles are determined to be unsatisfactory if the determination in ST20 is negative. In other words, the satisfactory product determination unit 29 shown in FIG. 1 outputs satisfactory/unsatisfactory information Qinf on the basis of the required quality Dq and the quality prediction value Qp, and this information Qinf is sent to the injection molding machine 10.

This process makes it possible to determine whether molded articles in mass-production molding are satisfactory without measuring the weight of the molded articles. As a result, the step of measuring the weight of the molded articles can be omitted, and production costs can be reduced.

The weight, dimensions, shapes and other such features of the molded articles have no bearing on their quality.

Also, in the present embodiment, the maximum value and minimum value of the monitor items were used in unmodified form for the upper control limit and lower control limit, but the present invention is not limited thereto, and the values can be arbitrarily set with consideration to the degree to which monitor values occur.

For example, when the precision of prediction in the quality prediction function needs to be improved during mass-production molding, the degree of revision is intentionally increased by setting the upper control limit and/or the lower control limit to be lower than the maximum value and higher than the minimum value. The precision of prediction in the quality prediction function can thereby be improved by reviewing the quality prediction function.

Therefore, precision of prediction in the quality prediction function can be maintained despite fluctuation in the monitor items or changes in the molding conditions over time. As a result, the frequency with which the quality prediction function must be reviewed can be reduced.

Obviously, various minor changes and modifications of the present invention are possible in the light of the above teaching. It is therefore to be understood that within the scope of the appended claims the invention may be practice otherwise than as specifically described.

What is claimed is:

1. A control apparatus for an injection molding machine, said apparatus having a neural network and operating so that information on test molding is inputted to the neural networks, a quality prediction function is determined by repeating the estimation of weight factors and thresholds on the neural networks as many times as the number of test molding cycles, and mass-production molding is begun with the quality prediction function, said control apparatus further comprising:

an upper/lower control limit determination unit for setting an upper control limit and a lower control limit for each of the monitor values that indicate the state in each part of a molding machine; and a function revision need determining unit for setting the range between the upper control limit and lower control limit set by the upper/lower control limit determination unit as the control range, and outputting a revision command for the quality prediction function and/or generating an alarm signal from an alarm signal generating unit when the monitor values acquired during mass-production molding have deviated from the control range.

2. The control apparatus of claim 1, wherein the upper control limit is a maximum value selected from the monitor groups obtained in test molding, and the lower control limit is a minimum value selected from the monitor groups obtained in test molding.

3. The control apparatus of claim 1, the control apparatus performing control wherein an alarm signal is generated from the alarm signal generating unit when the monitor values acquired during mass-production molding have deviated from the control range, and the quality prediction function is revised and/or the operation of the molding machine is stopped either when the alarm signal has continued for a specific number of times or when the cumulative number of alarm signals has reached a specific number.

4. The control apparatus of claim 1, wherein the control apparatus comprises a calculation unit for predicting quality values by providing the monitor values to the quality prediction function, and a satisfactory product determination unit for ascertaining that the molded articles are satisfactory when the quality prediction value predicted by the calculation unit is within the required quality, and ascertaining that the molded articles are unsatisfactory when the quality prediction value does not comply with the required quality.

* * * * *